United States Patent [19]

Nanba et al.

[11] 4,076,307
[45] Feb. 28, 1978

[54] SAFETY CHAIR FOR A CHILD FOR USE IN MOTOR VEHICLES

[75] Inventors: Kunio Nanba; Taro Ogawa, both of Kurashiki, Japan

[73] Assignee: Namba Press Kogyo Kabushiki Kaisha, Kurashiki, Japan

[21] Appl. No.: 720,591

[22] Filed: Sep. 7, 1976

[30] Foreign Application Priority Data

Jan. 23, 1976   Japan .............................. 51-7067[U]

[51] Int. Cl.² ............................................. A47D 1/10
[52] U.S. Cl. .................................... 297/250; 297/390
[58] Field of Search ............... 297/250, 254, 256, 216, 297/390

[56] References Cited

U.S. PATENT DOCUMENTS

| 1,584,161 | 5/1926 | Bear .................................... 297/254 |
| 2,679,282 | 5/1954 | Anderegg ....................... 297/250 X |
| 2,954,070 | 9/1960 | Moeller ............................ 297/250 X |
| 3,606,453 | 9/1971 | Cicero .............................. 297/254 |
| 3,819,230 | 6/1974 | Bloom ............................. 297/390 |
| 3,861,742 | 1/1975 | Leonard et al. .................... 297/216 |

FOREIGN PATENT DOCUMENTS 1,963,395   8/1970   Germany .............................. 297/254

Primary Examiner—Francis K. Zugel
Attorney, Agent, or Firm—Stevens, Davis, Miller & Mosher

[57] ABSTRACT

A safety chair for a child for use in motor vehicles arranged to be secured onto the passenger seat of the vehicle by means of a safety lap belt and comprising:
 a chair body consisting of
  a portion of soft material for absorbing a shock exerted to the upper torso of the child,
  a portion of cushion material for absorbing a shock exerted to the child's head, said portion of cushion material being provided at the front of said portion of soft material,
  a seat plate provided at the rear of said portion of soft material, and
  a frame for supporting the chair body and having an upper front portion and an armrest at each of both sides thereof,
 said upper front portion having a weakened portion against mechanical strength so that the portion is bent in the downward direction when shocks are exerted thereto.

5 Claims, 5 Drawing Figures

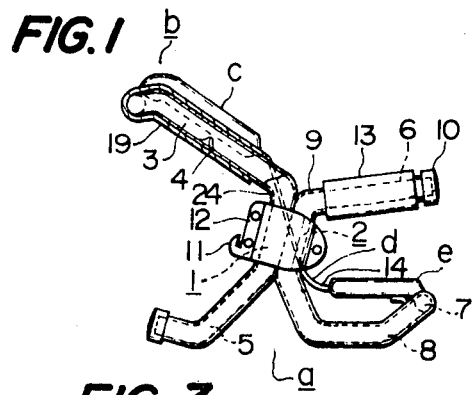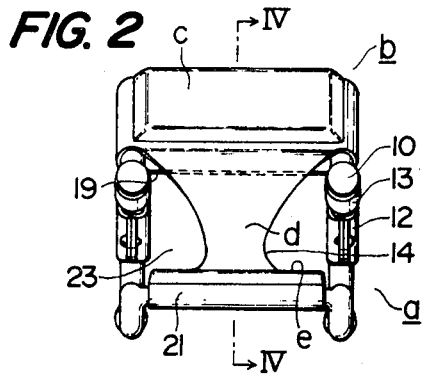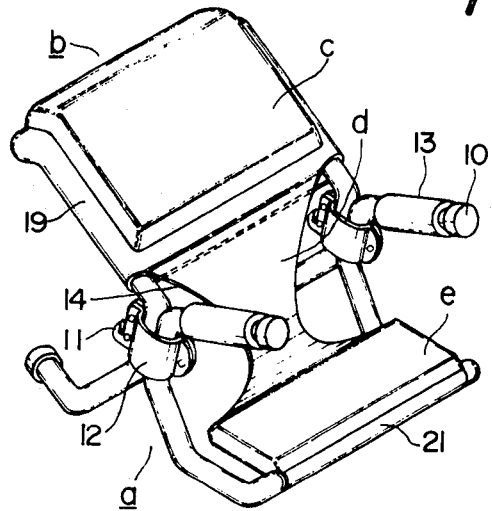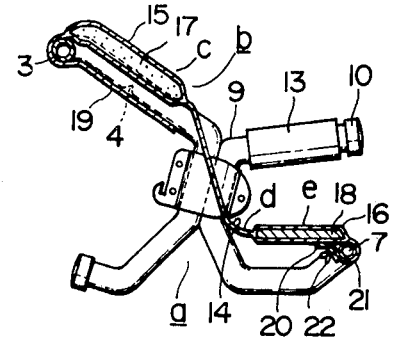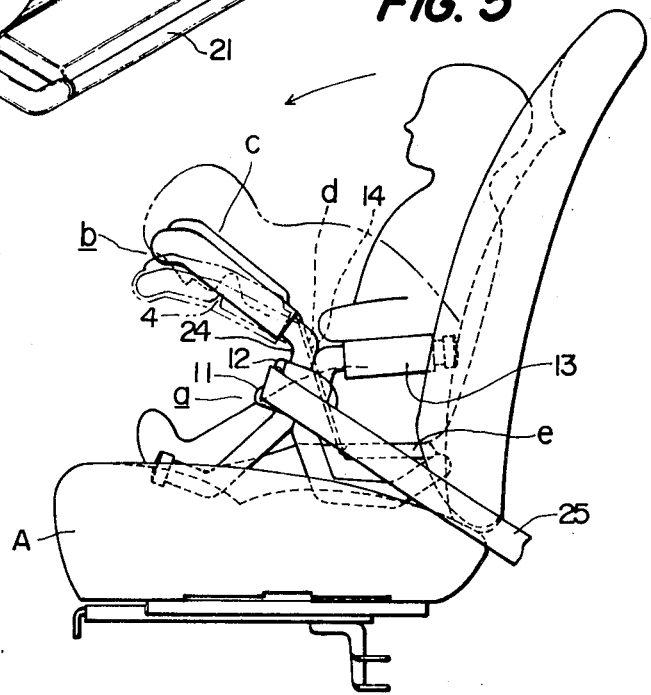

SAFETY CHAIR FOR A CHILD FOR USE IN MOTOR VEHICLES

The present invention relates to a safety chair for a child for use in motor vehicles.

An object of the present invention is to provide a chair for use in protecting a child in motor vehicles, which consists of a chair body supported in a frame and can be easily and firmly secured on a vehicle passenger seat by means of a safety lap belt of the vehicle, said chair body comprising by arranging a panel of a soft material, a cushion member mounted at the front of said panel, and a seat plate mounted at the rear of said panel, respectively, in such a manner that a portion for absorbing a shock exerted to the child's head, a portion for absorbing a shock exerted to the upper torso of the child and a seat portion are formed in this order from the front of the panel of the soft material to the rear thereof, and said frame having an elbow rest at each of both sides thereof.

Another object of the present invention is to provide a safety chair for a child for use in motor vehicles, which allows the child to be comfortably and safely seated astride the chair body.

During a crush accident and/or a rapid deceleration of the vehicle, said safety chair can prevent the child by means of the chair body from being thrown out in the forward direction as well as hold the child's head and the upper torso of the child throughout and when violent shocks are exerted to the child in the crush accident the frame is bent in the downward direction to absorb the shocks exerted to the child as much as possible and to extremely enhance the safety of the child in motor vehicles.

According to the present invention, the safety chair for a child for use in motor vehicles can be secured onto the vehicle seat by means of the safety lap belt of the vehicle. In addition, the safety chair of the present invention can be easily and speedily secured onto any passenger seat such as an assistant's seat and a rear seat in the vehicle on condition that said seat has a safety lap belt attached thereto and the mounting and detaching of the safety chair can be easily accomplished. Further, the mounting of the safety chair onto the vehicle seat can be firmly secured with no fear of being got loose by any strong shocks.

Moreover, the safety chair is so arranged that the child is seated astride the seat plate with both legs of the child being inserted respectively into both spaces formed by the chair body and both sides of the frame. It will be, therefore, understood that the child can be prevented by the chair body from being moved in the forward direction to slip under the portion of the chair body which functions to absorb the shock exerted to the child's head and that the child can be held sitting on the seat plate in an absolutely safe state within a space surrounded by both sides of the frame and the back of the vehicle seat. The safety chair makes it unnecessary to hold the child in adult passenger's arms in the vehicle and allows the child to be held stable in the space against the rolling of the vehicle without falling in lateral and forward directions even when the child falls asleep. Accordingly, even when the nobody other than a driver rides on the vehicle with the child, the safety chair of the present invention enables the driver to drive the vehicle safely without paying any attention to the child sitting on the safety chair in the vehicle, and further gives the child no such feeling that the child is restricted in behavior because the child can be held on the safety chair without using any means such as a belt and because there can be provided a sufficient space between the child and the members surrounding the child. Therefore, the child can move freely to some extent within the chair body and does not feel discomfort even when the child is slightly sweaty.

Further, the chair body comprises by forming, as an assembly, the portion for absorbing the shock exerted to the child's head, the portion for absorbing the shock exerted to the upper torso of the child and the seat portion, with the rear and the front ends of the chair body thus formed being attached to the frame, so that the structural stability of the chair is good and attaching stability of the chair to the vehicle seat becomes better when the child sits on the chair body to exert the child's weight thereto.

Particularly during a crush accident and/or a rapid deceleration of the vehicle, the child is supported at the crotch portion of the child by the chair body so as not to move in the forward direction but to fall in the forward direction with the crotch portion as a fulcrum of the movement to bring the whole body of the child including head, breast and abdomen into contact with the portion for absorbing the shock exerted to the child's head and the portion for absorbing the shock exerted to the upper torso of the child, respectively. At this instant these portions including the seat plate are resiliently deformed responding to the contact of the child to absorb the shocks, thus enhancing the safety of the child much more than the conventional safety chairs which were intended to support the head or the breast of the child alone to absorb the shocks exerted thereto. In addition, the surface area of the chair body which may contact the child is sufficiently large to distribute all over the surface the load of the shocks exerted to the child, thus greatly reducing the shock energies to keep the child safe.

When violent shocks are exerted to the child in the crush accident the forward portion including a portion for absorbing the shocks exerted to the child's head is bent in the downward direction by the shocks, so that the shocks are absorbed by said forward portion, thereby reducing the shock energy and enhancing the safety of the child in the vehicle.

Further, the safety chair of the present invention is simple in construction, small in size, low in manufacturing cost and easy in handling and has a long life and durability.

Other objects and merits of the present invention will be clearly understood from the following detailed description with reference to the accompanying drawings.

FIG. 1 is a side view with a portion broken away showing an example of the safety chair for a child for use in motor vehicles in accordance with the present invention;

FIG. 2 is a rear view of the safety chair shown in FIG. 1;

FIG. 3 is a perspective view of the safety chair shown in FIG. 1;

FIG. 4 is a sectional view taken along the line IV — IV of FIG. 2; and

FIG. 5 is a side view of the safety chair of the present invention showing the condition in which the safety chair is used.

Symbol (*a*) represents a frame assembly of a safety chair for use in protecting a child in a vehicle, said frame comprising a front frame member 1 and a rear frame member 2. Said front frame member 1 is formed by bending a pipe in the form of reversed "U" in such a manner that the upper portion of the front frame member 1 forms a supporting frame portion 3 comprising portions extending in an inclined fashion in the forward and upward directions, portions curving slightly in the downward direction and a cross bar extending transversely, said portions extending in an inclined fashion having at each lower side of middle portion thereof a notch 4 to allow said portion to be bent at this notch 4 when violent force is applied to said portion, and that the lower portion 5 of said front frame member 1 forms leg portions extending slantingly in the forward and the downward directions and portions extending substantially in the horizontal direction. The rear frame member 2 is formed by bending a pipe in the form of "U" in such a manner that there are formed armrests 6 inclining slightly in the upward direction and extending in the rearward direction, leg portions 8 extending in the rearward direction and a cross bar 7 extending transversely.

The front and the rear frame members 1 and 2 may be made of metals such as iron and stainless steel or of synthetic resins such as polyvinyl chloride, polypropylene, polyethylene and urea resin. These front and rear frame members 1 and 2 are covered with a sheet 9 of resilient material, for example, foam material such as polyethylene, polypropylene, polyurethane, polyvinyl chloride, synthetic rubber, or resilient material such as cotton and nonwoven cloth and have caps 10 attached to the ends thereof. The frame assembly (a) comprises by contacting the intermediate portions of the front and the rear frame members 1 and 2 with each other and firmly securing these portions by means of clamp members 12 each having a hook-shaped stopper 11 at the front side thereof, said stopper 11 being intended to be hung by the safety lap belt of the vehicle. Around the sheet 9 covering each armrest 6 of the rear frame member 2 is further covered with a buffer material 13 such as synthetic resins and synthetic rubber.

Symbol (b) represents a chair body formed as an integral member made of a panel of a soft material having some hardness. Said soft material may be a woven cloth, leather, rubber, synthetic resin, and a combination of woven cloth and synthetic foam resin. The chair body has a sheet portion 14 of narrower width provided at the middle thereof and there are provided closed sacks 15 and 16 at the front and the rear portions of the chair body. The front sack 15 contains an auxiliary buffer material 17 such as polyurethane, polyethylene, polyvinyl chloride, polypropylene and rubber, thus forming a portion (c) for absorbing the shock exerted to the child's head. The middle portion of the chair body forms a portion (d) for absorbing the shock exerted to the upper torso of the child by the resiliency and elasticity of the sheet portion 14. The rear sack 16 contains a plate 18 having a proper hardness and forms a seat plate (e). There are provided a bag-shaped fixing member 19 underside of the shock absorbing portion for the child's head (c) and a stopper 20 at the underside of the rear end of the seat plate (e). The fixing member 19 covers the upper portion of the front frame member 1 so as to support the head-shock absorbing portion (c) of the chair body (b) in stretched state all over the supporting frame portion 3, while the stopper 20 is fastened to a rearward overhanging part 21 of the chair body (b) by means of a thread 22 after said part 21 is hung round the cross bar 7 of the rear frame member 2. The seat plate (e) is held hanging from the head-shock absorbing portion (c), and spaces 23 into which both legs of the child are inserted are formed between both sides of the intermediate narrow portion of the chair body and both leg portions 8 of the rear frame member 2. Reference numeral 24 shows bent portions of said supporting frame portion 3.

Symbol (A) represents a vehicle seat such as the front and the rear seats and reference numeral 25 denotes a safety lap belt attached to such vehicle seat.

There will be now described how the safety chair of the present invention is used. As shown in FIG. 5, the safety chair is fixed onto the vehicle seat (A) by means of the safety lap belt 25 attached to the hook 11 of the clamp member 12. The child is seated on the seat plate (e) with the child's legs being inserted respectively into the spaces 22 formed at the both sides of the intermediate portion of the chair body.

During a crush accident and/or a rapid deceleration of the vehicle, the child enforced to move in the forward direction by the law of inertia is supported by means of the intermediate portion of the chair body (b). As shown by a double-dot-dash line in FIG. 5, the child falls in the forward direction with the child's crotch as the fulcrum of the movement in such a manner that the upper torso of the child, namely, the head, the breast and the abdomen are brought into contact with all over the shock absorbing portions of the chair body. At this instant, these shock absorbing portions are deformed responding to the portions of the child's body to be contacted therewith, thus permitting to absorb the shocks exerted to the head and the upper torso of the child by the resiliency of the chair body. At the same time, the safety chair is swung in the forward and the downward directions due to the shock energy exerted to the chair body (b) by the child's body in such a manner that the contact portion between the leg portions 8 of the rear frame member 2 and the vehicle seat (A) functions as a fulcrum of the swinging movement of the safety chair, thus further enhancing the buffer capacity of the chair.

Further, in case that the violent shocks are exerted to the child in the crush accident the supporting frame portion 3 is bent at the bent portions 24 and the notches 4 in the downward direction by the shocks, so that the shocks exerted to the upper torso of the child are absorbed by the supporting frame portion 3 bent at the bent portions 24 and that the shocks exerted to the head of the child are absorbed by the supporting frame portion 3 bent at the notches 4 thereby reducing the shock energy and enhancing the safety of the child in the vehicle.

Instead of the frame assembly (a), a box-shaped frame may be used integral with the chair body (b) attached to the frame. The chair composed of the box-shaped frame has the same functions as the chair composed of the above exampled frame assembly (a). The buffer material 13 covering the armrest 6 may be formed integral with the sheet 9. Instead of the notches 4 provided on the lower side of middle portion of the supporting frame portion 3, notches provided on the upper side of middle portion or both upper and lower surfaces of middle portion or a groove provided around the middle portion may be used.

When a foam material such as synthetic resins is further placed on the seat plate 18, the cushioning property is enhanced to provide a better sitting comfortableness.

What is claimed is:

1. A safety chair for a child for use in motor vehicles arranged to be secured onto the passenger seat of the vehicle by means of a safety lap belt and comprising:

a chair body consisting of a portion of soft material for absorbing a shock exerted to the upper torso of the child, said portion of soft material having some hardness and having a narrower width in the middle thereof, a portion of cushion material for absorbing a shock exerted to the child's head, said portion of cushion material being provided at the front of said portion of soft material, and a seat plate having a proper hardness and provided at the rear of said portion of soft material;

a frame for supporting the chair body having a front frame member and a rear frame member, firmly secured at the intermediate portions thereof with each other, said front frame member comprising an upper front portion inclining in the forward and the upward directions from said intermediate portion, a lower front portion and leg portions extending slantingly in the forward and the downward directions from said intermediate portion, each connected in this order, said rear frame member comprising armrests inclining slightly in the upward direction and extending in the rearward direction from said intermediate portion and leg portions extending in the rearward direction from said intermediate portion, each connected in this order, said upper front portion having a weakened portion against mechanical strength so that the portion is bent in the downward direction when shocks are exerted thereto; and spaces into which both legs of the child are inserted respectively, formed between said narrow portion of soft material and both sides of the frame;

said head-shock absorbing portion of the chair body being attached to the upper front portion of the frame, said seat plate being attached to the lower portion of the rear frame member of the frame.

2. A safety chair as claimed in claim 1, wherein said portion for absorbing the shock exerted to the child's head comprises a closed sack and a buffer material such as polyurethane, polyethylene, polyvinyl chloride, polypropylene and rubber contained in said sack.

3. A safety chair as claimed in claim 1, further comprising a hook-shaped stopper provided on said frame and intended to be hung by the safety lap belt of the vehicle.

4. A chair adapted to be mounted on a vehicle seat assembly having a back supporting member and a seat member to sit on, and a safety belt associated with the assembly which is adapted to be secured over the lap of an occupant of the seat assembly, said chair comprising a first pair of laterally spaced tubular frame members each bent to have an upwardly inclined portion and a downwardly inclined portion, both of said portions extending outwardly from the said back supporting member when the chair is mounted on the seat assembly, and an intermediate portion integral with the upwardly and downwardly inclined portions;

cushioning means bridging the space between said upwardly inclined portions and secured thereto for receiving and protecting the head of an occupant of the chair when the occupant is thrown forwardly from the back supporting member by sudden deacceleration of the vehicle;

a second pair of laterally spaced tubular frame members each bent into a first upper portion which extends substantially horizontally to the said seat member and has an end which rests against the said back supporting member when the chair is mounted on the seat assembly, said first upper portion providing an arm rest for an occupant of the chair, and a lower portion bent into the general shape of a U and having a base portion which rests on the said seat member when the chair is mounted on the seat assembly, and an intermediate portion disposed between the said upper and lower portions, a seat panel bridging the space between the said second pair of tubular members and secured to said lower portions of the second pair of tubular members;

a flexible web extending between the said cushioning means for the occupant's head and said seat panel and fastened thereto, said web having openings adjacent each of the laterally spaced frame members for passage of the occupant's legs therethrough when the occupant is seated on said seat panel;

said intermediate portions of each first tubular member being disposed in contact with the intermediate portion of a second tubular frame member;

means about the contacting intermediate portions for clamping them together; and means on said clamping means for securing a seat belt wrapped about the chair thereto.

5. The chair of claim 4 wherein the said upwardly inclined portions of the said first tubular members are notched to promote bending of the tubular members when the cushioning means is struck by an occupant's head.

* * * * *